No. 712,113. Patented Oct. 28, 1902.
E. BAUSCH & G. HOMMEL.
BINOCULAR TELESCOPE.
(Application filed Jan. 7, 1901.)
(No Model.) 2 Sheets—Sheet 2.
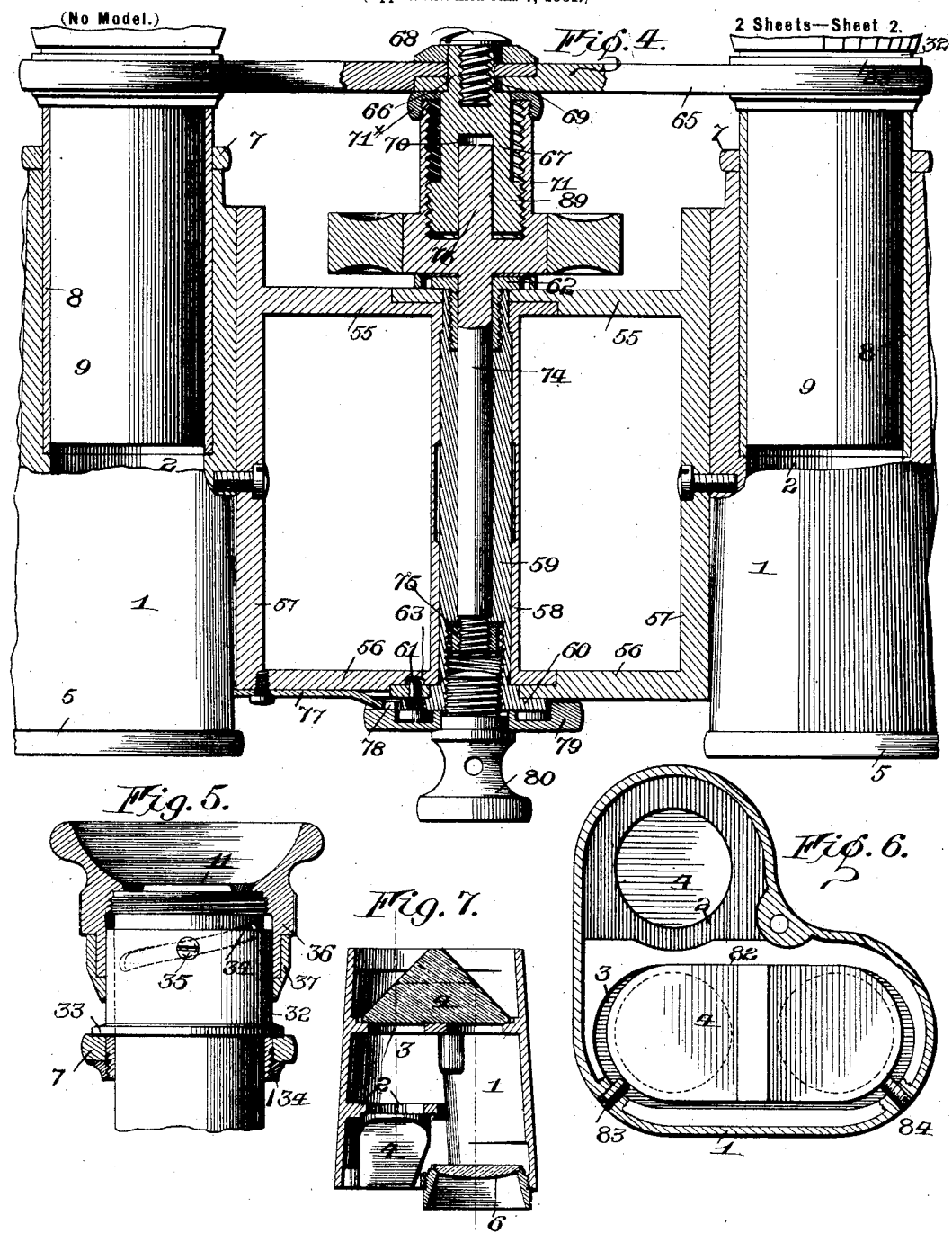
Witnesses. Inventors

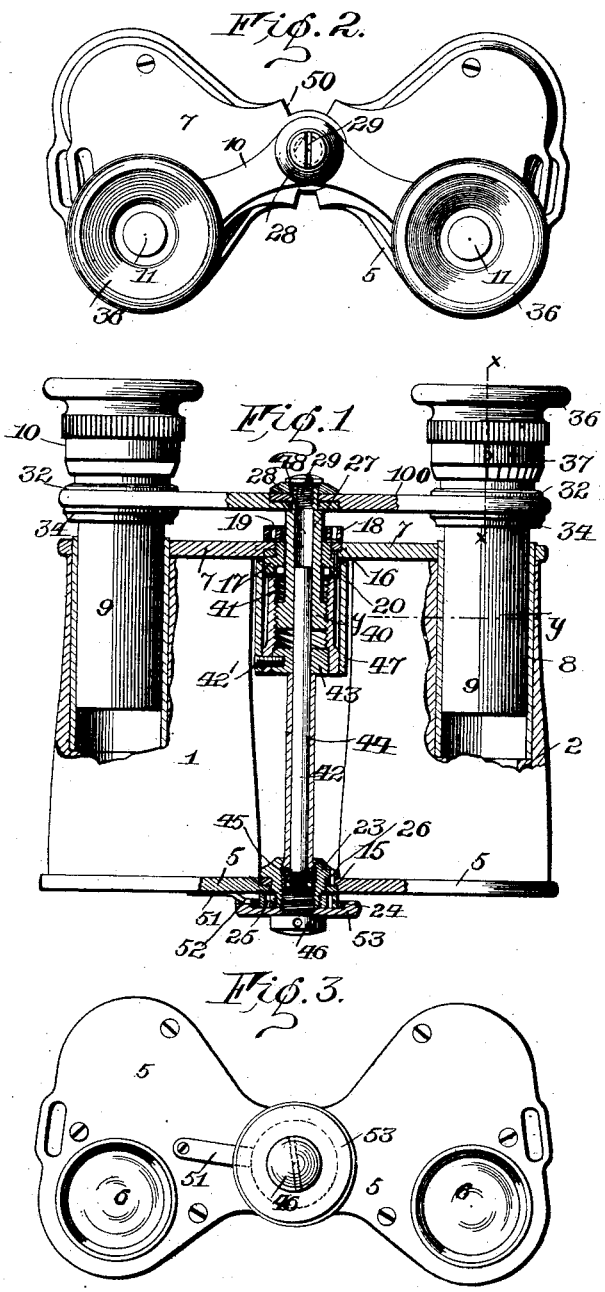

UNITED STATES PATENT OFFICE.

EDWARD BAUSCH AND GEORGE HOMMEL, OF ROCHESTER, NEW YORK, ASSIGNORS TO THE BAUSCH & LOMB OPTICAL COMPANY, OF ROCHESTER, NEW YORK, A CORPORATION OF NEW YORK.

BINOCULAR TELESCOPE.

SPECIFICATION forming part of Letters Patent No. 712,113, dated October 28, 1902.

Application filed January 7, 1901. Serial No. 42,274. (No model.)

*To all whom it may concern:*

Be it known that we, EDWARD BAUSCH and GEORGE HOMMEL, of Rochester, in the county of Monroe and State of New York, have invented certain new and useful Improvements in Binocular Telescopes; and we do hereby declare the following to be a full, clear, and exact description of the same, reference being had to the accompanying drawings, forming a part of this specification, and to the reference-numerals marked thereon.

Our present invention has for its object to provide an improved construction of high-power field-glasses or binocular telescopes whereby the separate barrels or tubes may be adjusted laterally for variations in pupilary distance and the eyepieces simultaneously adjusted longitudinally to focus the glass without danger of lateral motion between the parts, retaining the eyepieces in accurate focal alinement with their corresponding objectives, and also to provide a simple adjustment permitting a secondary focal adjustment to one eyepiece, accommodating the glass for the use of persons having eyes of different strength.

Our invention further consists in providing means for adjustably securing the prisms on their shelves or platforms in the casings, whereby they may be adjusted laterally thereon and secured in accurate position.

To these and other ends our invention consists in certain improvements hereinafter fully described, and the novel features being pointed out in the claims at the end of this specification.

In the drawings, Figure 1 is an elevation of a binocular telescope or field-glass constructed in accordance with our invention, the operating mechanism being shown in section and parts of the casings broken away to more clearly illustrate the construction of the device. Fig. 2 is a top plan view, and Fig. 3 is a bottom plan view, thereof. Fig. 4 is a longitudinal sectional view similar to that of Fig. 1, illustrating a modification of the adjusting mechanism. Fig. 5 is a sectional view on the line *x x* of Fig. 1 showing the independent adjustment for one of the eyepieces. Fig. 6 is a cross-sectional view on the line *y y* of Fig. 1, illustrating the prism adjustment; Fig. 7, a longitudinal sectional view showing the arrangement of the prisms.

Similar reference-numerals in the several figures indicate similar parts.

The adjusting mechanisms I have shown are adapted to be used upon binocular field-glasses or telescopes, particularly the form shown in United States Letters Patent No. 584,976, granted to Ernst Abbe June 22, 1897, and these embody generally the casings 1, having shelves 2 and 3, upon which are mounted Porro prisms 4.

One end of the casings is closed by heads 5, carrying the objectives 6, and upon the opposite ends are heads 7, in which are mounted tubes 8, the lower ends of which extend inwardly into the casing and abut against one side of the shelves 2. Mounted in said tubes are telescoping or draw tubes 9, having heads 10, in which are mounted lenses or eyepieces 11, and by forming comparatively long bearing-surfaces between the two tubes we are enabled to prevent lateral movement between the parts to interfere with the optical alinement of the eyepieces or objectives and also to prevent the entrance of dust to the interior of the casings or to the prisms.

The casings are adapted to be adjusted to the pupilary distance between the eyes of the operator, and to accomplish this we arrange hinged joints between the two casings, as will be described. At the proximate edges of the heads 5 and 7 are formed extensions 15 and 16, adapted to overlap, a portion of each being cut away to form flush joints. The extensions 16 are provided with apertures through which extends a tubular bolt 17, having upon its outer end a circular nut 18, provided with apertures 19, adapted to receive a spanner or wrench. A pin 20, passing through the head of the bolt and engaging one of the arms 16, secures it in position while the nut is being applied. The overlapping arms or extensions 15 on the heads 5 are hinged by a similar bolt 23, having a nut 24, provided with apertures 25, and it is also secured against revolving by a pin 26. The sliding eyepieces or draw-tubes 9 are each provided with arms 100, pivoted at their proximate ends to the upper end of a vertically movable and non-rotatable member 27, secured to the arms by a washer 28 and screw 29. Said connection, however, permits said arms to swing on the member as a pivot. The arms are secured to the tubes 9 by means of sleeves 32, in which the tubes are mounted, having annular shoulders 33 at one side of the arms, and nuts 34, threaded on the sleeves, engage the opposite side of said arms, so that as the latter are adjusted the tubes 9 are moved together. An independent vertical movement is permitted one of the eyepieces by making the tube in which it is arranged movably supported in its sleeve 32 and providing the former with a spiral slot or cam-track 134, in which engages the end of a screw 35, projecting inwardly from the inner surface of the sleeve. The outer end of the tube is provided with a cap 36, the lower end of which extends over the sleeve 32, and secured thereon is a ring 37, having a graduated scale or markings, as shown in Fig. 1, adapted to register with an index-line on the sleeve. By constructing the ring 37 separate from the cap we are enabled to screw the latter into place and adjust the ring by revolving it on the cap until the scale registers with the index-marks corresponding with the position of the eye lens or tube in its sleeve, when the ring may be secured permanently in position.

The simultaneous adjustment of the eyepieces relative to the objectives is accomplished by providing upon the lower end of the member 27 a head 40, having upon its exterior screw-threads coöperating with threads upon the interior of a sleeve or nut 41, attached by a screw 42' to a hub 43, formed integral with or rigidly attached to an arbor 42, the upper end of which extends into a central aperture 48 in the member 27, serving to guide the latter as it is moved inwardly and outwardly by the rotation of the nut or sleeve 41. The lower portion of the arbor 42 below the hub 43 is inclosed by a tube 44, secured in the nut 23, and a nut 45 on the end of the arbor engages against the shoulder formed by the end of the tube 44. A suitable covering 47, having a knurled or milled edge, is applied over the sleeve 41 and also secured by the screw 42' and lends a finished appearance to the device and affords a suitable hold for the fingers to manipulate it.

The swinging movement of the casings 1 on the hinges is limited by means of engaging shoulders 50, formed at opposite sides of the extensions on the heads 5, as shown in Fig. 2.

To adapt the glasses to the pupilary distance of one individual and yet permit them to be adjusted for the use of others, we provide upon one of the heads 5 a leaf-spring 51, the end of which engages a notch 52 in a disk 53, secured stationary upon the end of the nut 24 by the head of the screw 46 entering the bolt 23. By loosening the screw 46 the disk 53 may be revolved until the notch therein registers with the end of the spring 51, when the casings may be turned on their hinges or joints until the eyepieces are adjusted for the pupilary distance between the operator's eyes. Then by tightening the screw 46 the disk will be secured, so that upon subsequent movements of the glass the proper adjustment will always be indicated as the spring and notch engage, their engagement, however, serving to indicate the proper adjustment and not to lock the parts.

In Fig. 4 we have shown a modification of the structure just described, in which the casings 1 are connected by separate arms 55 and 56, arranged at the upper and lower ends of frames 57, having their ends undercut to form smooth joints. The overlapping portions of the arms upon one frame are adapted to extend over the corresponding portions of the opposite arms, and the latter are connected by a tubular shell 58. Arranged within the shell is a sleeve 59, having a head 60, engaging the outer arm 56 and secured against revolving by a screw 61, and at the opposite end of the sleeve is a tubular nut having the head 52, which engages over the outer arm 55, uniting the frames 57 by a tight hinge connection. The end of the screw 61 also projects into a segmental slot 63 in the inner arm 56, which limits the swinging movement of the casings on their hinge. The draw-tubes 9 are provided with arms 65, having the overlapping ends hinged to an extension 66 on a pillar 67, secured by a screw 68 and prevented from rotary movement by a flattened surface 69 engaging a similar surface in one of the apertures provided in the arms 65. The lower end of the pillar is provided with a threaded head 89, and extending into the latter is a central aperture 70. The adjustment of the arms is accomplished by an internally-threaded nut or sleeve 71 engaging the head 89, and the nut is provided with an arbor or spindle 74, adapted to rotate in the sleeve 59, being secured therein by a nut 75 at its lower end. A projection or guide 76 is arranged within the sleeve 71 and projecting into the aperture 70 in the pillar 67 guides the latter, and a cap 71$^X$ on the sleeve 71 limits the upward movement of the pillar and prevents separation of the parts. The adjustment of the device to the pupilary distance of the operator's eyes is similar to that heretofore described and embodies the spring 77, secured to the arm 56, which engages a notch 78 in a disk 79, the latter being secured to the end of the sleeve 59 by a screw 80.

In glasses of the class described, in which a combination of prisms is employed to refract the light and increase the focal distance between the objective and eyepiece, it is essential that the bases or proximate faces of the prisms 4 should lie in parallel planes and also that the centers of their refracting-faces should be in a direct line. The first requisite is easily accomplished by accurately milling the faces of the shelves 2 and 3; but to accomplish the second adjustment it is necessary to provide means for adjusting the prisms longitudinally.

In finishing the surfaces of the shelves by the operation above referred to surfaces or shoulders 82 are formed upon each at right angles to each other, against which one edge of the prisms bear. Small screws 83 and 84, projecting through the casing at an angle to each other, engage at the sides of the curved ends of the prisms, as shown in Fig. 6. By this arrangement it will be seen that by adjusting the screws the prisms may be moved longitudinally in either direction upon their shelves until their centers are coincident, insuring a perfect reflection of the image without distortion, when they are tightly secured in position against the surfaces or shoulders 82. The screws 83 and 84 being accessible from the exterior of the casing allows the prisms to be easily and quickly adjusted without removing them, and when the usual covering of leather or similar material is applied to the casing the screws are concealed.

The various adjusting devices we have described are particularly adapted to be employed upon field-glasses or telescopes of high power, in which it is necessary to hold the eyepieces in accurate focal alinement without any lateral movement between the parts, and the hinged or jointed connection between the casings permits a range of adjustment between the centers of the eyepieces, whereby the liability of the glasses producing a double image is prevented and the glasses are capable of use by different persons.

As far as the focusing adjustment of the instrument is concerned it is immaterial whether or not the objectives are separated a greater distance apart than the eyepieces, as in the Abbe patent before referred to.

We claim as our invention—

1. In a binocular telescope the combination with the casings having the longitudinally-movable eyepiece-tubes therein, separate projections upon each casing adapted to overlap, and tubular bolts connecting said projections, of arms connecting the eyepiece-tubes, adjusting devices operating through the bolts and connected to the arms whereby the eyepieces may be moved relatively to their casings.

2. In a binocular telescope the combination with the casings having the movable eyepieces, connections between the casings, and separate arms arranged between the eyepieces, of a relatively stationary member mounted on the arms, a movable member coöperating therewith and mounted on the casings and a guide for the former member arranged within the latter.

3. In a binocular telescope the combination with the casings having the movable eyepieces, hinge connections between the casings, arms connecting the eyepieces and a relatively stationary member carried upon said arms, of a guide arranged upon the casings extending into said member, and a movable member coöperating with the stationary member and mounted upon the guide.

4. In a telescope the combination with a casing having the guide, a tube movable longitudinally therein having the eyepiece, and projections upon the casing, an arm on the tube, and a longitudinally-movable adjusting member operating through one of the projections on the casing and connected to the arm, of a guide supported in the other projection extending into said member, and a rotary adjusting member coöperating with the latter and supported upon the guide.

5. In a telescope the combination with a casing having a movable eyepiece therein, projections at the side of the casing, and an arm supporting the eyepiece, of a hollow pillar movable longitudinally through one of the projections connected to the arm and having screw-threads upon its lower end, a rotary sleeve arranged between the projections having threads upon its interior coöperating with those upon the pillar, a guide supported in the other projection and extending into the pillar, and means for limiting the upward movement of the latter.

6. In a telescope the combination with a casing having the movable eyepiece, projections upon the casing, an arm supporting the eyepiece, and a hollow pillar movable longitudinally through one of the projections connected to the arm and having a threaded head, an arbor revolubly mounted upon the other projection engaging the interior of the pillar, a rotary sleeve having threads upon its interior engaging those upon the pillar-head and supported between the projections.

7. In a telescope the combination with a casing having the movable eyepiece, projections upon the casing, an arm supporting the eyepiece, and a hollow pillar movable longitudinally through one of the projections connected rigidly to the arm and having a threaded head, an arbor revolubly mounted in the other projection extending into the pillar, a hub on the arbor and a sleeve on the hub having the threaded interior coöperating with the threaded hub.

8. In a binocular telescope the combination with the casings, overlapping projections thereon, and tubular hinge connections between the latter, movable eyepieces in the casings, hinged arms connecting said eyepieces, and a longitudinally-movable pillar connected to the arms and having the screw-threads, of a guide supported on the projections in the axial line of the casing-hinges and extending into the pillar, a rotary sleeve supported on the guide having the threaded interior coöperating with the pillar.

9. In a binocular telescope the combination with the casings, overlapping projections thereon, and tubular hinge connections between the latter, movable eyepieces in the casings, hinged arms connecting the eyepieces, and a pillar connected to said arms having the threaded head, of a guide for the pillar engaging the interior thereof and supported in the projections on the casings, a rotary sleeve on said guide having threads upon its interior coöperating with those upon the pillar-head, and means arranged above the latter to limit its movement in one direction.

10. In a binocular telescope the combination with the casings having movable eyepieces therein, hinge members upon each of the casings having stops upon each side of their centers adapted to limit the swinging movement of the casings in both directions and hinged arms between the eyepieces, of an adjusting mechanism arranged between the said arms and casings whereby the eyepieces may be adjusted relatively to their casings.

11. In a telescope, the combination with a casing having an objective therein, a tube carrying an eyepiece movable rotarily and longitudinally relatively to the objective, and a spiral cam connection arranged between the casing and tube, of a cap secured to said tube, and a part having indicia thereon and separate from but mounted on the cap and adapted to be rotated with said tube and stationary indicia on the casing with which that on the tube coöperates.

12. In a telescope, the combination with a casing having an objective therein, a tube carrying an eyepiece movable rotarily and longitudinally relatively to the objective, and a spiral cam connection arranged between the casing and tube, of a cap secured to the tube, a ring separate from but mounted on the cap having a scale and adapted to be rotated with said tube, and a stationary index on the casing with which the scale coöperates.

13. In a binocular telescope the combination with the casings having the movable tubes carrying the eyepieces, separate connections between the casings and tubes, and an adjusting mechanism arranged between said connections, of a separate sleeve mounted on the supporting connections of the tubes, and spiral connections between the sleeve and tube, a depending index-ring adjustably mounted on the cap and surrounding the end of the sleeve, and an index on the latter.

14. In a binocular telescope the combination with the casings, the movable tubes carrying the eyepieces operating therein, connections between the casings, separate arms attached to the tubes, and adjusting devices connected to the arms for moving the tubes simultaneously, of a separate support on one of the arms embracing the lens-tube, a spiral connection between the support and the tube whereby the two lenses may be separately adjusted, a cap adjustable on the tube and provided with an index, and an index on the support.

15. In a telescope the combination with a casing having prisms arranged therein, shelves for the latter having upon one side a surface adapted to engage the side of the prism, of separate independently-adjustable means engaging the ends of the prism for adjusting it longitudinally and laterally on the shelf and securing it thereon.

16. In a telescope the combination with a casing having prisms arranged therein, shelves supporting the latter having upon one side a surface adapted to engage one side of the prism, of separate independently-movable adjusting devices arranged at an angle to the engaging surface on the shelf and engaging opposite ends of the prisms to move them longitudinally and laterally in the casing in contact with said surface.

17. In a telescope the combination with a casing having the prisms 4, shelves 2 and 3 supporting the latter having the surfaces 82, of the screws 83 and 84, arranged at an angle to said surface and engaging opposite ends of the prisms whereby they may be moved longitudinally and laterally in the casing and rigidly secured on their shelves in contact with the surface 82.

18. In a telescope the combination with a casing provided with two prisms having their bases lying in parallel horizontal planes but arranged in different vertical planes, of shelves in the casing supporting the prisms having a bearing-surface upon one side engaging one side of each prism and adjusting devices accessible from the exterior of the casing engaging the ends of the prisms at an angle to said surfaces, whereby prisms may be adjusted longitudinally and laterally on their shelves.

EDWARD BAUSCH.
GEORGE HOMMEL.

Witnesses:
IRA D. KINGSBURY,
J. HAMMELE.